(No Model.)
B. BOEKELMAN.
MUSICAL NOTATION.
No. 402,225. Patented Apr. 30, 1889.
WITNESSES:
Patrick Henry Brown
Charles Austin W. Mahon
INVENTOR.
Bernard Boekelman
BY
Augustus T. Gurtitz
ATTORNEY.

UNITED STATES PATENT OFFICE.

BERNARD BOEKELMAN, OF NEW YORK, N. Y.

MUSICAL NOTATION.

SPECIFICATION forming part of Letters Patent No. 402,225, dated April 30, 1889.

Application filed April 4, 1888. Serial No. 269,525. (No model.)

*To all whom it may concern:*

Be it known that I, BERNARD BOEKELMAN, a citizen of the United States, and a resident of the city of New York, in the county and State of New York, have invented certain new and useful Improvements in Musical Notation; and I do hereby declare that the following is a full, clear, and exact description of the same, reference being had to the accompanying drawings, which form part of this specification.

In studying and teaching music it is of great advantage to obtain a quick perception of the constituent parts of musical compositions, which are generally called the "voices" or "voice parts" of which a composition is built up; and my invention has for its object a simple and convenient notation by which these different voice parts of musical compositions can be easily recognized by the appearance of the notes or musical characters, so that the student may be able easily to follow and distinguish the theme or subject, the counter-theme or second subject, as well as the melodic or harmonic voice parts, or any other parts of the composition, by the appearance of the notes or characters representing the same on the page.

I illustrate applications of my invention in the drawings, in which—

Figure 1 shows a portion of Bach's well-known Fugue No. 3 from the well-tempered clavecin, (being Kroll's arrangement of the same,) in which the different voice parts are distinguished according to my invention by notes of different colors. Fig. 2 shows my invention as applied to Mendelssohn's well-known "Song without Words," No. 1, E major. Fig. 3 shows the fourth and part of the fifth measures of Fig. 2, in which the different parts are distinguished according to my invention by notes of different shapes. Fig. 4 shows notes of different appearance which may be employed in carrying out my invention.

Similar letters of reference indicate like parts.

One of the chief obstacles in the way of the student to a clear and ready apprehension of musical compositions, and especially of such as are difficult or complicated, is the inability to separate musical compositions as now written into their different voices or structural parts, and as a result of this the student is often confused and delayed, having to learn and trace laboriously the parts or voices of the composition, which are principal and secondary, and those which are added for figurative accompaniment, rhythmical symmetry, or for filling or rounding out. By my improved notation these obstacles are removed and the composition is so represented that its different voice parts are distinguishable at a glance and recognized by the appearance of the notes representing such parts.

Thus in Fig. 1 the notes forming the subject or theme, which are inclosed by the broken lines *a*, are to be printed in one distinguishing color, as in red, while the notes constituting the counter-theme, which are inclosed in the broken lines *b*, are to be printed in another distinguishing color, as in a light green. The notes of the second voice of the subject or theme, sometimes called the "answer," which are inclosed in the broken lines marked *c*, may be printed in the same distinguishing color as are the notes of the subject—namely, in red. The notes of the third voice of the theme, inclosed in the broken lines marked *d*, and the notes of the answer thereto, inclosed in the broken lines marked *e*, may all be also in red color. The accompanying counter-themes, inclosed in the broken lines *f* and *g*, may be in light green, as at *b*. The notes representing the melodic portions, which in Fig. 1 are not inclosed in any lines, are to be in a color, as in black, which will readily distinguish them from the subject and answer and also from the counter-theme.

In compositions arranged for a greater number of voices than this Fugue used to illustrate my invention the additional voices are to be represented by other suitable distinguishing colors.

In Fig. 2 I show my invention applied to Mendelssohn's well-known "Song without Words," No. 1, E major. The notes of the melody, inclosed by the broken lines *h*, are to be printed in one color, as in red. The notes of the bass or bass melody, inclosed in the broken lines *i*, are to be printed in another color, as in light green; and notes of the figurative accompaniment, the portion not inclosed in any lines, are to be printed in another color, as in black.

In Fig. 3, which is a repetition of fourth and portions of the fifth measures of Fig. 2, I show my invention carried out by means of notes of shapes differing from the shapes of the notes now commonly employed, so that the whole composition may be printed in one color and the distinction between the constituent parts indicated by the shapes of the notes. In this instance the notes of the melody are of a square form, the notes of the bass or bass melody are of a diamond shape, and the figurative accompaniment is printed in notes of the usual form.

In Fig. 4 I show several forms of notes which may be employed to carry out my invention—triangular, square, crescent, and diamond forms—and many other forms may be employed, if desired, in place of these, or for additional parts or voices.

In cases where, according to the present notation, a single note is both melody and accompaniment, a duplication of the same should take place, in order that each constituent part may be shown in its proper color or shape. I have added such notes in the second and fifth measures of Fig. 2 at $x\ x\ x$, and also in the corresponding measure of Fig. 3 at $x$.

It will thus be seen that by the use of musical compositions containing my invention the learner will be enabled at a glance to distinguish the different constituent parts of the same, whether the distinction is made by notes of different colors or of different shapes, or by a combination of colors and shapes, which may also be done. For example, in the illustration of my invention shown in Fig. 3 the notes of the melody might be of square form, as shown, and the notes of the figurative accompaniment of the usual form, and both printed in one color, and the notes of the bass or bass melody might be of the usual form instead of diamond shape, but printed in a color different from that of the other parts, to accomplish the same result. It is apparent, therefore, that different colors or notes of different shapes, or a combination of these, may be used without departing from my invention, and I do not limit myself to any particular color, colors, or shapes.

I am aware that it has been proposed to print each of the seven notes of the scale in a different color, and also that forms of notes different from the ordinary notes have been proposed in order to use such notes for two systems of notation; and I do not claim any such devices.

Having thus described my invention, what I claim as new, and desire to secure by Letters Patent, is—

1. The herein-described improvement in musical notation, consisting in representing the several constituent or voice parts of musical compositions by notes of such different appearance that such several parts may be distinguished from each other by the appearance of the notes, substantially as described.

2. The improvement in musical notation, consisting in representing the several constituent or voice parts of musical compositions by notes of different colors, whereby such parts may be distinguished from each other by the color of the notes, substantially as described.

BERNARD BOEKELMAN.

Witnesses:
  PATRICK HENRY BROWN,
  CHARLES AUSTIN MCMAHON.